(12) United States Patent
Rosemann et al.

(10) Patent No.: US 7,055,783 B2
(45) Date of Patent: Jun. 6, 2006

(54) FASTENING DEVICE FOR AN ELONGATED OBJECT IN PARTICULAR A CABLE TREE

(75) Inventors: Frank Rosemann, Rockenberg (DE); Johann Reindl, Biebertal (DE); Markus Kumpf, Allertshausen (DE)

(73) Assignee: Newfrey LLC, Newark, DE (US)

( * ) Notice: Subject to any disclaimer, the term of this patent is extended or adjusted under 35 U.S.C. 154(b) by 6 days.

(21) Appl. No.: 10/720,627

(22) Filed: Nov. 24, 2003

(65) Prior Publication Data
US 2004/0144899 A1 Jul. 29, 2004

(30) Foreign Application Priority Data
Nov. 29, 2002 (DE) ................. 102 56 144

(51) Int. Cl.
*F16B 15/00* (2006.01)
(52) U.S. Cl. .............. 248/71; 248/73; 248/74.4; 24/297; 24/459; 411/508; 411/509
(58) Field of Classification Search ............. 248/74.4, 248/73, 74.2, 71, 916, 903, 68.1, 74.1; 24/297, 24/459, 16 R, 20 R, 284; 411/508, 509, 411/510; 174/48, 68.3, 69, 101, 100
See application file for complete search history.

(56) References Cited

U.S. PATENT DOCUMENTS

| | | | |
|---|---|---|---|
| 4,506,419 A * | 3/1985 | Mitomi .................. 24/297 |
| 4,568,215 A * | 2/1986 | Nelson ................... 403/13 |
| 4,697,774 A | 10/1987 | Sarton et al. |
| 4,811,922 A | 3/1989 | Yoneyama |
| 4,817,910 A * | 4/1989 | Molnar et al. ........... 248/68.1 |
| 5,168,604 A * | 12/1992 | Boville .................... 24/297 |
| 5,203,529 A * | 4/1993 | Penniman ............ 248/222.11 |
| 5,257,768 A * | 11/1993 | Juenemann et al. ......... 248/604 |
| 5,505,411 A * | 4/1996 | Heaton et al. ............... 248/70 |
| 5,577,303 A * | 11/1996 | Sacks et al. ............. 24/581.1 |
| 5,601,262 A * | 2/1997 | Wright .................... 248/74.4 |
| 5,848,771 A * | 12/1998 | Hancock-Bogese et al. ..... 248/74.3 |
| 5,850,676 A * | 12/1998 | Takahashi et al. ........... 24/297 |
| 5,881,800 A * | 3/1999 | Chung .................... 165/80.3 |
| 6,076,781 A * | 6/2000 | Kraus ....................... 248/73 |
| 6,324,732 B1 * | 12/2001 | Arisaka et al. ............. 24/458 |
| 6,431,585 B1 * | 8/2002 | Rickabus et al. ........ 280/728.3 |
| 6,443,403 B1 * | 9/2002 | Page et al. ................. 248/71 |
| 6,494,412 B1 * | 12/2002 | Gombert .................. 248/65 |
| 6,641,093 B1 * | 11/2003 | Coudrais .................. 248/73 |

FOREIGN PATENT DOCUMENTS

DE 19 75 273 U 12/1967
DE 295 00 680 U 1/1995

* cited by examiner

*Primary Examiner*—Kimberly Wood
(74) *Attorney, Agent, or Firm*—Harness, Dickey & Pierce, P.L.C.

(57) ABSTRACT

The invention relates to a fastening device for an elongated object, in particular a cable tree, having a holder (1) intended for attachment of the elongated object and an adjacency surface (5) for the elongated object, and having a fastening element (16) connectable to the holder (1) for fastening the holder (1) to a part. For connection of the holder (1) to the fastening element (16), a plug-in assemblable snap coupling is provided, closable by a force directed against the adjacency surface (5) of the holder (1).

24 Claims, 1 Drawing Sheet

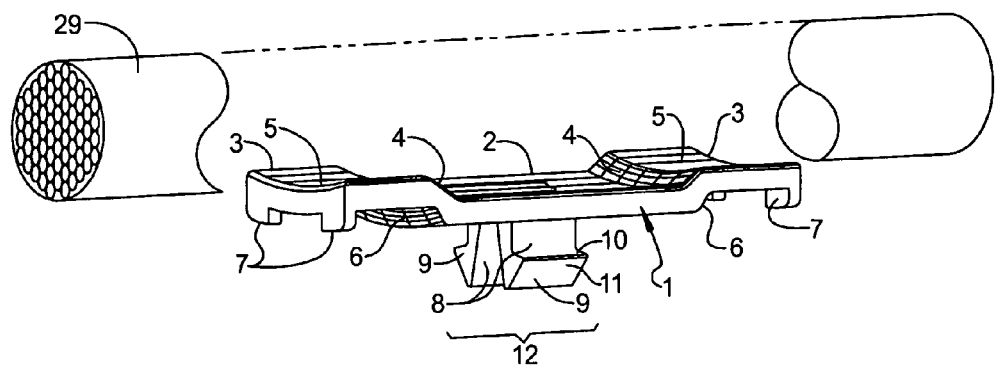
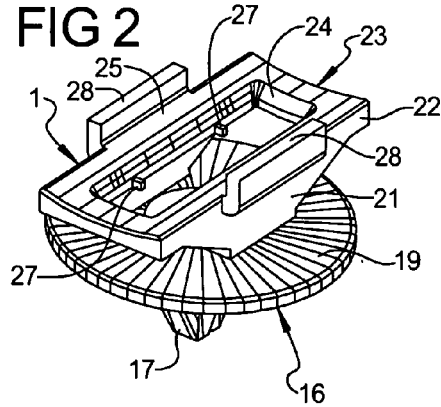
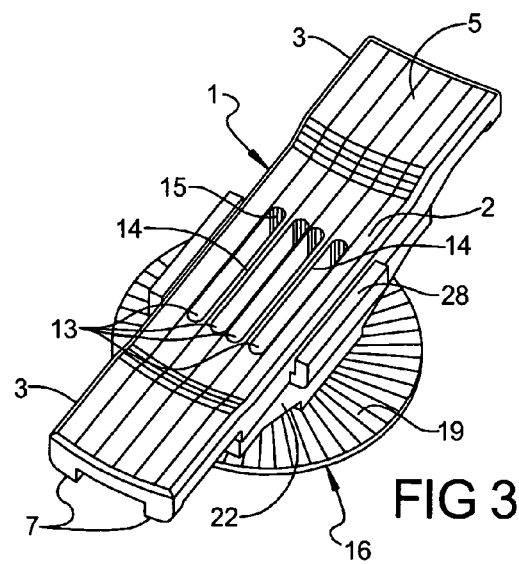
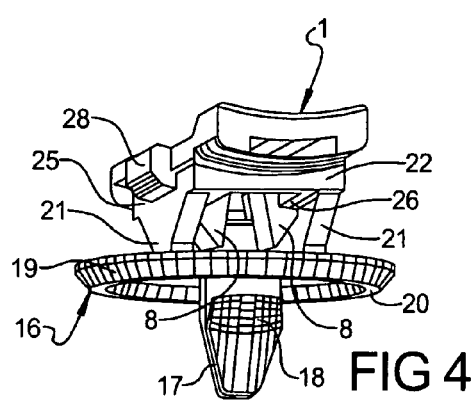

FASTENING DEVICE FOR AN ELONGATED OBJECT IN PARTICULAR A CABLE TREE

CROSS-REFERENCE TO RELATED APPLICATIONS

This application claims the benefit of German Patent Application No. DE10256144.3, filed Nov. 29, 2002. The disclosure of the above application is incorporated herein by reference.

BACKGROUND OF THE INVENTION

The invention relates to a fastening device for an elongated object, in particular a cable tree, having a holder intended for attachment of the elongated object and having an adjacency surface for the elongated object, and having a fastening element connectable to the holder for fastening the holder to a part.

BACKGROUND OF THE INVENTION

Fastening devices of the kind specified are employed principally for fastening cable trees in motor vehicles. What is meant by a cable tree is a bundle of electrical lines extending in like direction and connected to form a structural unit by winding them with a tape. For fastening to a part, the cable tree is connected to the holder of the fastening device with a tape and then fastened to the part by means of the fastening element attached to the holder. To compensate for manufacturing dimensional deviations, the holder may be made displaceable in a lengthwise direction of the cable tree relative to the fastening element.

A fastening device of this kind is disclosed in DE 295 10 148 U1. The plate-like holder here comprises an oblong hole. In the oblong hole, a holding pin is inserted, whose fastening end projects from the holder and which has a recess to be engaged by segments of the edges of the oblong hole. For connecting holder and holding pin, the holding pin, fastening end foremost, is pressed into the oblong hole far enough so that the edges of the oblong hole snap into the recess in the holding pin. Only when the two parts have been connected with each other can the holder be connected to the cable tree. No possibility of re-separating the holder and the fastening element from each other is provided.

Further, U.S. Pat. No. 5,112,013 discloses a device for fastening cable trees in motor vehicles, comprising a tape encircling the cable tree and a fastening element for fastening the tape to a part. On the tape, a cross-piece is provided, extending in a lengthwise direction of the cable tree and insertable in a guide groove of the fastening element, in which groove it is displaceable lengthwise of the cable strand to compensate for dimensional tolerances. Here, the fastening element and tape are connected to each other before installation, and then can no longer be separated from each other.

SUMMARY OF THE INVENTION

The object of the invention is to create a fastening device of the kind initially mentioned, distinguished by especially simple assembly, and rendering different modes of installation available. This object is accomplished by the invention as specified in the claims.

In the fastening device according to the invention, for connection of the holder to the fastening element, a plug-in assemblable snap coupling is provided, closable by means of a force directed towards the adjacency surface of the holder. In this way, various advantages are gained in assembly. If the holder is connected to the fastening element before attachment of the cable tree, then the holder can be brought into coupling position in relation to the fastening element, and then the coupling can be snapped in by gentle pressure on the adjacency surface of the holder. Another simple possibility of assembly consists in that the fastening element is placed on the holder from above as it rests on a substrate and then pressed home. Both modes of assembly are readily performed either manually or automatically.

The conformation according to the invention, however, also permits the holder to be connected to the cable tree separately from the fastening element, the fastening element and the holder being only then plugged together. This may be advantageous since the fastening element projecting from the holder will not interfere when the holder and cable tree are then assembled. The conformation according to the invention is of advantage further if separate installation of the fastening element and the cable tree in the vehicle is desired. Thus, in some applications, it may be advantageous to install a number of fastening elements in the vehicle manually or with a robot using suitable setting devices, and then connecting the cable tree, already provided with holders, to the set fastening elements by plugging the snap couplings together. Since the closing of the snap couplings requires less expenditure of effort than the setting of the fastening elements, the installation of the cable tree can be simplified by such a procedure.

Another advantage of the fastening device according to the invention lies in the possibility of combining different sizes or types of holder with the fastening element in the manner of a modular principle. Thus, for example, fastening elements for different hole sizes in the part may be produced and finished with the same holder design. Likewise, different conformations of the holder may be fastened to the same construction of fastening elements. In this way, numerous requirements of applications can be met with low tool costs.

According to another aspect of the invention, the snap coupling is so configured that it can be released again by means of a tool after locking. In this way, the cable tree can be simply pulled for repairs without destroying or damaging the fastening device.

In yet another aspect of the invention, the snap coupling forms a connection displaceable in a lengthwise direction of the cable tree between the holder and the fastening element. By this displaceable connection, dimensional deviations between the position of two neighboring holders and the position of the fastening locations on the part can be compensated.

Preferably, the one part of the snap coupling comprises an undercut recess and the other part comprises at least one spring pin insertable in the recess, having a lateral projection snapping into the undercut of the recess. The recess, in the manner of an oblong hole, may have a greater extent in a lengthwise direction of the holder than the spring pin insertable in the holder, in order thereby to make possible a displacement of the holder relative to the fastening element.

A preferred embodiment provides that the holder, on its under side away from the adjacency surface, comprises two fingers projecting downward with catches projecting laterally. Each finger may be arranged on an elastically deformable web of the holder, formed by two parallel slits. This conformation makes possible a simple forming mold for making the holder, and ensures a suitable flexibility of the fingers.

In the position connected to the fastening element, the holder may be secured against twisting relative to the fastening element by means for positively interlocking geometrically. In this way, the snap coupling is relieved and maintenance of a defined holder position is assured. Preferably, for security against rotation, the fastening element comprises two ribs embracing the holder on its long sides.

To facilitate assembly, the holder displaceable relative to the fastening element may be retainable in an intermediate location, whence a displacement in opposed directions with defined exertion of force is possible. For this purpose, the holder or the fastening element may have projections on which in each instance, the other part is supported and which are surmountable by an elevated force of displacement.

The fastening element, according to the invention, comprises a holding pin on the side away from the holder, anchorable in a hole of a part, preferably with the aid of a spring catch element. For support on the part, the fastening element may comprise a flange encircling the fastening end of the holding pin joined to the fastening element. The peripheral edge of the flange may be provided further with a sealing lip, preferably of softer material. The coupling part of the fastening element preferably comprises a rectangular frame having a rectangular aperture, the longer sides of the frame being connected to the flange by struts extending transverse to the plane of the frame. The struts create a clearance between the frame and the flange, accessible on the short sides of the frame and thus permitting release of the coupling parts snapped into the frame with the aid of a tool.

BRIEF DESCRIPTION OF THE DRAWINGS

The invention will be illustrated below in more detail in terms of an embodiment represented by way of example in the drawings, in which:

FIG. 1 is a perspective view of a holder for a fastening device for an elongated object according to a preferred embodiment of the present invention;

FIG. 2 is a perspective view of a fastening element of the present invention;

FIG. 3 is a perspective side view of the interconnected parts of the fastening device of the present invention; and FIG. 4 is an oblique perspective plan view of the interconnected parts of the present invention.

DETAILED DESCRIPTION OF THE PREFERRED EMBODIMENT

FIG. 1 shows the holder 1 of the fastening device. The holder 1 consists of an essentially rectangular plate, articulated into a middle segment 2 and two end segments 3 forming the narrow ends. The end segments 3 are each attached to the middle segment 2 by a blunt-edged elevated step 4 on top of the holder 1. Consequently, the top of the middle segment 2, viewed from above, lies deeper than the adjacency surfaces 5, formed by the tops of the end segments 3, for the cable tree to be fastened to the holder 1. The steps 4 facing each other on top of the holder 1 correspond to back-to-back steps 6 on its under side. Opposed to the steps 6, there are projections 7 configured at the outer corners of the end segments 3. The steps 6 and the projections 7 serve to secure the lateral position of tapes slung or wound about the cable tree and around the end segments in order to fasten the former. For better adaptation of the holder 1 to the peripheral contour of a cable tree 29, the end segments 3 and the middle segment 2 are provided with a curvature concave upwards, whose axis of curvature lies on the longitudinal centerline of the holder 1.

For fastening the holder 1, the middle segment 2 on its under side comprises two spring fingers 8 projecting downward. The fingers 8 are arranged symmetrical to a longitudinal median plane dividing the holder 1, and at their opposed sides, they each have a catch 9 with a locking surface 10 facing the middle segment 2 and a ramp surface 11 turned away from the middle segment 2. The fingers 8 together form a first coupling part 12 of a two-part snap coupling.

The fingers 8 are elastically deformably connected to the middle segment 2 of the holder 1. As may be seen in FIG. 3, the middle segment 2 comprises four parallel slits 13 piercing it completely. The slits 13 form two outer webs 14 and a middle web 15. A finger 8 is attached to each of the outer webs 14. The webs 14 form elastically deformable elements that yield springingly when a force bringing them closer to each other is applied to the free ends of the fingers 8. This makes possible a springing compression of the fingers 8 for plugging the snap coupling together.

FIG. 2 shows a fastening element 16 intended for connecting the holder 1 to a part, in particular of sheet metal, not shown in detail. The fastening element 16 has a holding pin 17 insertable in an opening of a part and there retainable by means of a catch element 18. On the holding pin 17, a plate-like flange 19 is arranged. The flange 19 serves to support the fastening element 16 in the part. It may in addition be provided with an annular sealing lip 20 of softer material, in order to be able to tightly close the opening in the part that receives the holding pin.

On the side away from the holding pin 17, a rectangular frame 22 is fastened to the flange 19 by means of two struts 21, said frame extending essentially in a plane parallel to the flange 19. The frame 22 forms the second coupling part of the two-part snap coupling 23. The struts 21 are arranged on the longer sides of the frame 22. The frame 22 comprises a rectangular framed opening 24. The width of the framed opening 24 is smaller than the distance between the struts 21. In this way, on the under side of the longer sides 25 of the frame 22, towards the flange 19, an adjacency surface 26 is formed, receding in the manner of an undercut relative to the framed opening 24 and intended for adjacency of the locking surfaces 10 with the catch projections 9 of the fingers 8.

The width of the framed opening 24 corresponds substantially to the distance between the sides, turned away from each other, of the fingers 8 of the holder 1. In the framed opening 24, symmetrical with respect to the center of the opening, projections 27 are attached to the sides 25, their distance being somewhat greater than the width of the fingers 8 measured in a lengthwise direction of the holder 1. On their outer sides turned away from each other, the legs 25 bear parallel ledges 28, whose spacing corresponds essentially to the width of the middle segment 2 of the holder 1. The ledges 28 are intended to secure the holder 1 against rotation.

For assembly with the fastening element 16, the holder 1 is placed on the frame 22 with longitudinal axis oriented parallel to the latter, and pressed against the fastening element 16 by fingers 8 turned towards the framed opening 24. The fingers 8 thus slide over the sides 25 by the ramp surfaces 11 of the catches 9, and are thereby pressed together. As soon as the holder 1 reaches the position shown in FIG. 4 and rests on the frame 22, the sides 25 release the catches 9, whereby the latter snap into the locking position shown in FIG. 4, in which their locking surfaces 10 rest against the adjacency surfaces 26 and fix the holder 1 to the fastening element 16. The ledges 28 thus laterally embrace the middle segment 2 and thereby secure the holder 1 against rotation.

The holder 1 may be connected to the fastening element 16 either centrally or, insofar as the length of the framed opening 24 permits, eccentrically. If the holder, as shown in FIGS. 3 and 4, is mounted centrally, then it is secured in that position by bearing of the fingers 8 on the projections 27. By a force acting on the holder 1 in lengthwise direction, however, the supporting resistance of the projections 27 can be overcome, and the holder 1 shifted relative to the fastening element 16. In this way, deviations of location between the position of the holder 1 on a cable tree and the opening in the part accommodating the fastening element 16 can be compensated.

What is claimed is:

1. A fastener system, comprising:
    a fastener element having a holding pin, the holding pin adaptable to mount the fastener element to a component part;
    a rectangular-shaped frame of the fastener element having a parallel pair of opposed ledges laterally mounted to the frame, and a rectangular-shaped opening positioned between the opposed ledges;
    a flange connectably joining the holding pin and the rectangular-shaped frame;
    a plurality of projections positioned adjacent the rectangular-shaped opening;
    a substantially rectangular-shaped deflectable holder having a pair of distending spring fingers supported from at least one adjacency surface and a pair of longitudinally separated concave shaped surfaces having the concave shaped surfaces oppositely directed from the spring fingers;
    a common width of the spring fingers;
    wherein the spring fingers are positioned having the common width bounded between adjacent side pairs of the projections, operably providing a locked holder position; and
    the projections including at least an adjacent pair of deflectable projections operably deflected by a lateral force applicable to the holder to release the spring fingers from the locked holder position permitting a lateral translation of the holder;
    wherein in a fastener engaged position, the longitudinally separated concave shaped surfaces of the holder face away from the component part and are adaptable to support an elongated object, the spring fingers are operably engaged with the rectangular-shaped opening by deflection of the deflectable holder, the holder is operably secured between the opposed ledges to resist rotation relative to the fastener element, and the holding pin is engaged with the component part.

2. The system of claim 1, wherein the spring fingers each comprise:
    a ramp surface;
    a catch extending from the ramp surface; and
    a locking surface adjacent the catch;
    wherein the locking surface and the catch are cooperatively engageable within the rectangular-shaped opening of the rectangular-shaped frame to releasably fasten the holder to the fastener element.

3. A method for forming a multi-part fastener operable to join an elongated part to a vehicle part, comprising:
    creating a pair of longitudinally separated concave shaped surfaces on a holder element positioned to face away from the vehicle part;
    extending a plurality of spring fingers from the holder element opposite from the concave shaped surfaces;
    forming a frame releasably fastenable to the holder element using the spring fingers;
    deflecting the holder element adjacent the spring fingers to operably deflect the spring fingers for insertion into the frame;
    joining the frame to a flange;
    positioning a holding pin on the flange;
    forming a plurality of parallel slits through the holder element; and
    sliding the spring fingers into separate ones of the parallel slits;
    wherein in an installed condition, the elongated part is operably connected to the concave shaped surfaces of the holder element, the holder element is releasably fastened to the frame, and the frame joined to the flange has the holding pin operably engaged with the vehicle part.

4. The method of claim 3, comprising shaping the holder element to correspond to an elongated part shape.

5. The method of claim 3, comprising securing the holder between an opposed pair of ledges to resist rotation relative to the fastener element.

6. The method of claim 3, comprising releasably locking the holder element along the frame.

7. The method of claim 6, comprising positioning the holder element between a pair of deflectable projections.

8. An elongated object fastening device, comprising:
    a holder having an upper surface operable to engage an elongated object;
    an under surface positioned opposite to the upper surface;
    at least two fingers projecting away from the under surface;
    a catch laterally projecting from each of the fingers;
    a fastener element connectable to the holder and operable to fasten the holder to a part;
    a plug-in snap coupling operable to connect the holder to the fastener element;
    a plurality of parallel slits extending through the holder; and
    at least two elastically deformable webs defined between adjacent ones of the parallel slits;
    wherein each finger is connectably attached to a separate one of the webs; and
    wherein the snap coupling is closable by a force directed against the upper surface of the holder.

9. An elongated object fastening device, comprising:
    a holder having an upper surface operable to engage an elongated object;
    a fastener element connectable to the holder and operable to fasten the holder to a part;
    a plug-in snap coupling operable to connect the holder to the fastener element;
    a frame of the fastener element having a rectangular framed opening;
    a pair of opposed, longer sides of the frame; and
    a flange connected to the longer sides by a pair of opposed struts extending transverse to a plane of the frame;
    wherein the snap coupling is closable by a force directed against the upper surface of the holder.

10. A method for forming a multi-part fastener operable to join an elongated part to a vehicle part, comprising:
    creating a holder element;

extending a plurality of spring fingers from the holder element;

forming a frame releasably fastenable to the holder element using the spring fingers;

joining the frame to a flange;

positioning a holding pin on the flange;

forming a plurality of parallel slits through the holder element; and sliding the spring fingers into separate ones of the parallel slits;

wherein in an installed condition, the elongated part is operably connected to the holder element, the holder element is releasably fastened to the frame, and the frame joined to the flange has the holding pin operably engaged with the vehicle part.

11. An elongated object fastening device, comprising:

a fastener element including a frame connected to a flange, the flange further including a peripheral edge, and a sealing lip positioned adjacent the peripheral edge, the sealing lip being created of a material softer than a flange material;

a holder releasably connectable to the frame of the fastener element having a pair of support surfaces spatially separated from each other, each support surface defining a concave curvature facing away from the flange when the holder is connected to the frame, the pair of surfaces of the holder being operable to support an elongated object;

a middle segment of the holder integrally joining the support surfaces, the middle segment having a plurality of parallel, spatially separated webs oriented longitudinally with respect to the middle segment;

an opposed pair of fingers integrally connected to the middle segment and extending opposite to the support surfaces, the fingers elastically deflectable towards each other and the middle segment compressible proximate the webs to engage the fingers with the fastener element.

12. The device of claim 11, wherein the fastener element further comprises a holding pin integrally connected to the flange and oppositely positioned from the frame, the holding pin operable to connect both the flange and the holder to a part.

13. The device of claim 11, wherein the elongated object comprises a cable tree received within the concave curvature of each support surface.

14. The device of claim 11, comprising a locked position of the fingers wherein the fingers operably provide a first releasable connection between the holder and the fastener element, the fingers being releasable from the locked position by operation of a tool.

15. The device of claim 14, wherein the fastener element further comprises a plurality of projections, wherein in the locked position the fingers are releasably retained between the projections in an intermediate position.

16. The device of claim 15, wherein the holder is laterally displaceable from the intermediate position in each of two opposed directions relative to the fastener element upon exertion of a force applied in a lengthwise direction of the elongated object.

17. The device of claim 14, wherein the fingers further comprise:

a catch laterally projecting from each of the fingers;

wherein the catches are oppositely positioned from each other.

18. The device of claim 17, wherein the fastener further comprises a substantially rectangular framed opening including an undercut surface, the catches of the fingers being engageable with the undercut surface in the locked position.

19. The device of claim 17, further comprising:

a plurality of parallel slits created through the middle segment, each of the webs defined between proximate ones of the parallel slits;

wherein each of the fingers is integrally attached to a separate one of the webs.

20. The device of claim 19, comprising:

each of the fingers having a width; and wherein each of the parallel slits extends greater in a lengthwise direction of the holder than the width of the fingers.

21. The device of claim 14, comprising:

a pair of opposed ledges extendable from the fastener element;

wherein when the holder is connected to the fastener element, the holder is secured between the opposed ledges against rotation relative to the fastener element operably creating a second releasable connection between the holder and the fastener element.

22. The device of claim 21, comprising:

an opposed pair of sides of the fastener element;

wherein each of the opposed ledges is integrally connected to one of the sides of the fastener element.

23. The device of claim 22, wherein each of the sides includes one of a pair of opposed struts extending transverse to a plane of the frame, the opposed struts operable to connect the sides to the flange.

24. The device of claim 13, comprising a catch element created on the holding pin operable to enhance anchoring of the holding pin to the part.

* * * * *